United States Patent
McCallum

[15] 3,698,332
[45] Oct. 17, 1972

[54] POSITIVE PRESSURE FEED WHEEL
[72] Inventor: Donald A. McCallum, Burlington, Ont., Canada
[73] Assignee: International Harvester Company, Chicago, Ill.
[22] Filed: Sept. 24, 1970
[21] Appl. No.: 75,059

[52] U.S. Cl. ................................. 111/77, 221/211
[51] Int. Cl. ............................................ A01c 7/18
[58] Field of Search .......... 111/78, 77; 221/211, 278; 222/177

[56] References Cited
UNITED STATES PATENTS

| | | |
|---|---|---|
| 3,482,735 | 12/1969 | Goulter .....................221/211 |
| 2,986,305 | 5/1961 | Koerper et al.............221/211 |
| 3,432,075 | 3/1969 | Myers et al. ..............111/77 X |
| 3,100,462 | 8/1963 | Steele et al. ..................111/77 |
| 3,142,274 | 7/1964 | Winter..................221/211 X |
| 3,156,201 | 11/1964 | Tweedale ....................111/77 |

Primary Examiner—Robert E. Pulfrey
Assistant Examiner—Stephen C. Pellegrino
Attorney—Noel G. Artman and Floyd B. Harman

[57] ABSTRACT

A positive pressure feed wheel for a planter of the pneumatic type wherein a hollow rotor vented to atmospheric air pressure is provided with radial fingers having a passage therethrough terminating in a seed pick-up port. The rotor is rotatable in a closed stationary housing having an internal air pressure greater than atmospheric, so that positive air pressure forces seed against the ports and holds them there during a predetermined rotation of the rotor.

11 Claims, 4 Drawing Figures

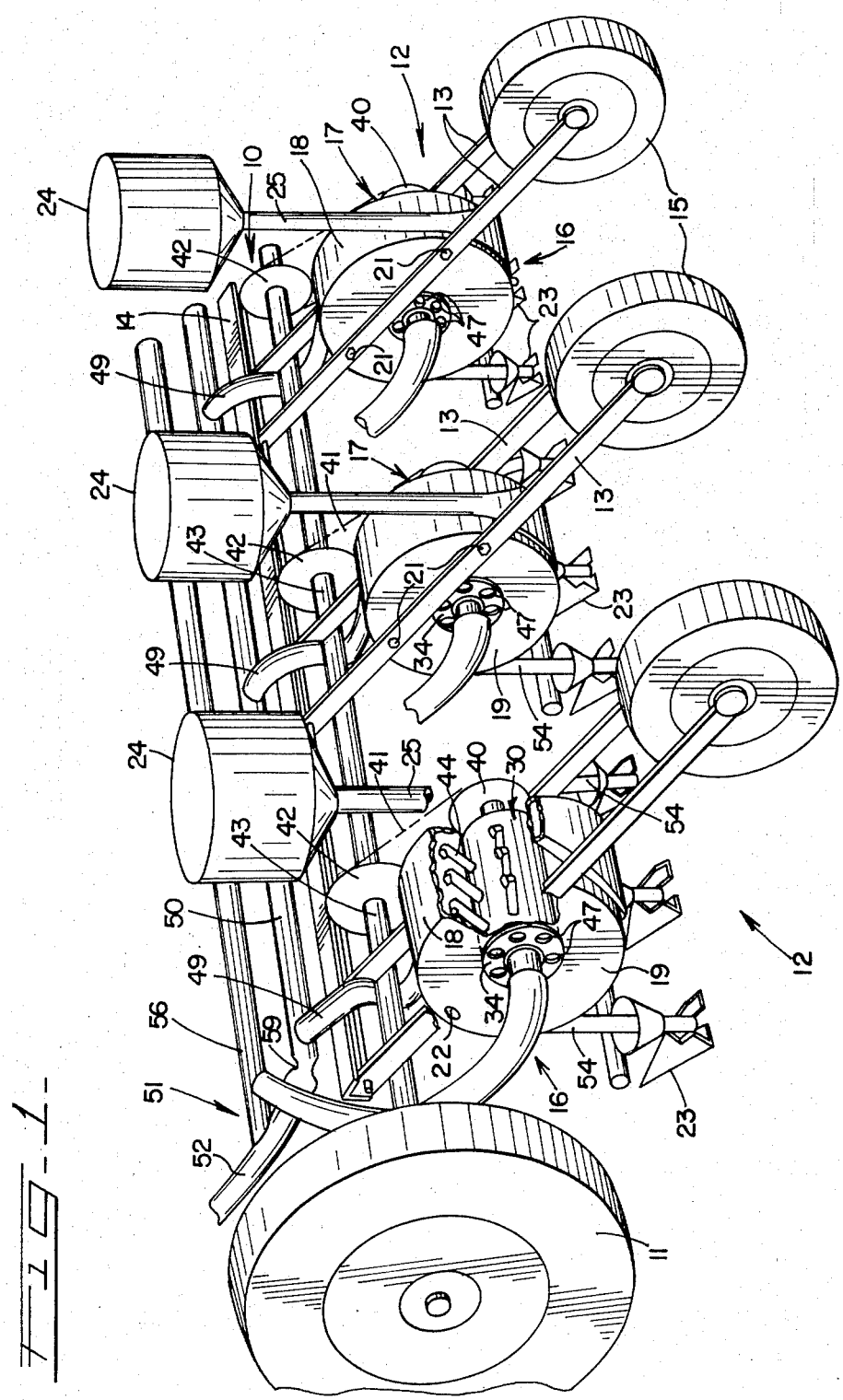
INVENTOR
DONALD A. McCALLUM

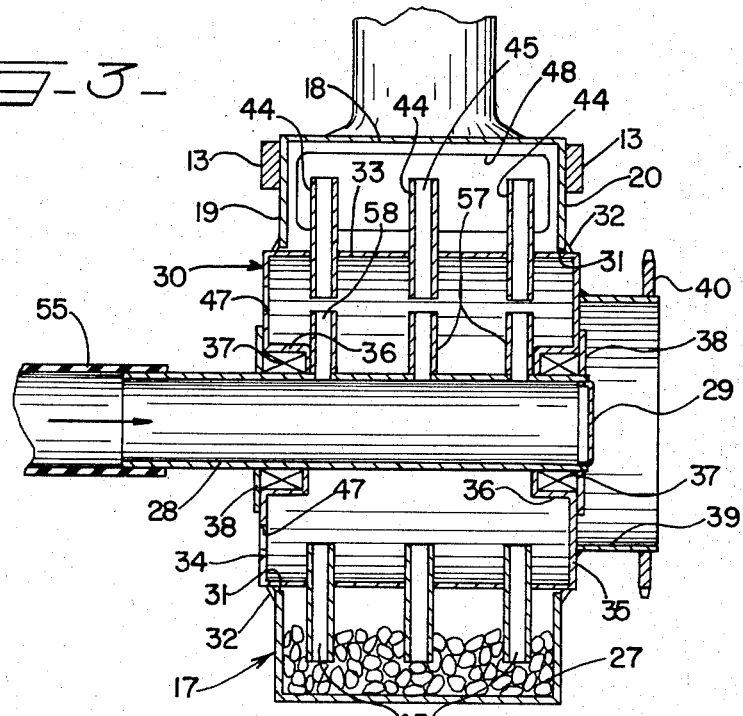
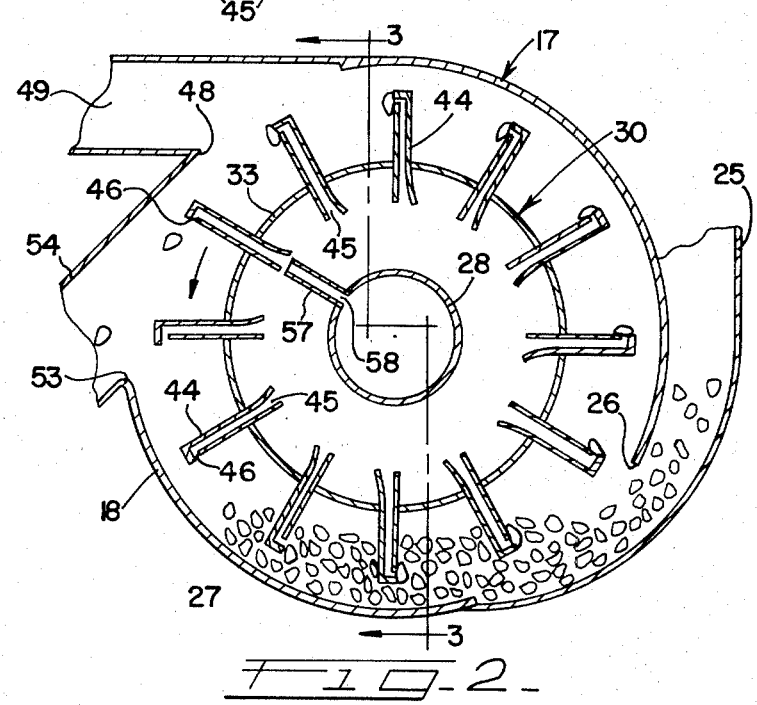

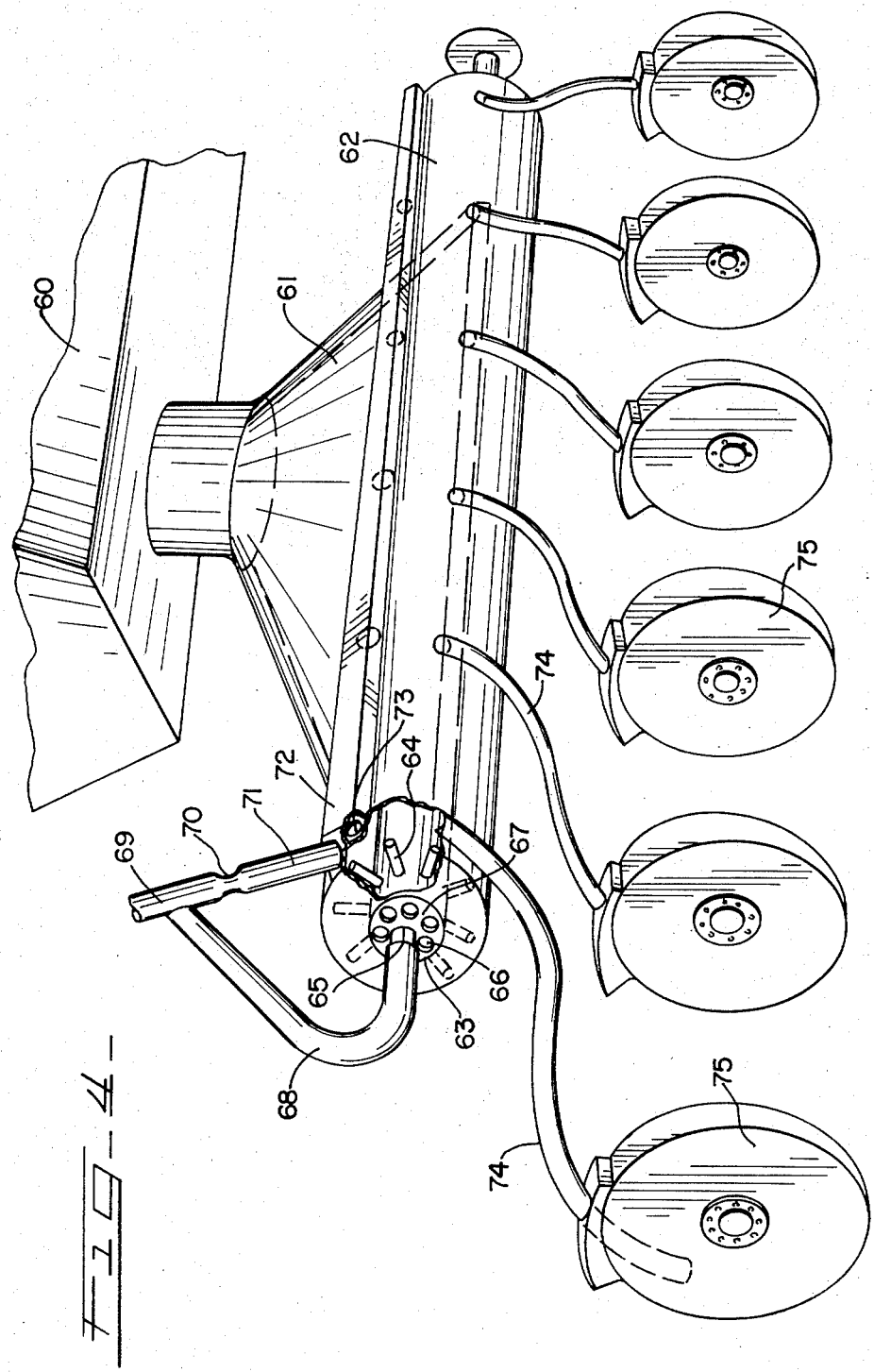

3,698,332

POSITIVE PRESSURE FEED WHEEL

BACKGROUND OF THE INVENTION

This invention relates to planters and particularly to a planter of the pneumatic type. More specifically, the invention concerns a planter for metering and dispensing seeds of varying size and shape.

For maximum yield in crops such as corn and the like it is important that the seed be accurately deposited in the ground in uniform numbers and spacing. Conventional planters require seed to be carefully graded as to size and shape, and old seed plate techniques, wherein a plate must be chosen having cells to fit the seed selected for planting, have not proved adequate to meet the growing demand for higher planting speeds with increasingly powerful tractors and larger planters. In addition to the need for a multiplicity of plates to match different sizes and shapes of seed, another serious disadvantage of such plates has been the frequency of repair problem presented by the many moving parts required to drive the plate and dispense the seed, as well as the damaging effect of the abrasive action of the moving parts of such mechanical planters on the seed.

One effort to achieve greater selectivity and accuracy in a planter at higher speeds has been in the direction of the so-called cell-less planter as disclosed, for example, in such U.S. Pats. as Varco No. 2,613,850, Keeton No. 3,308,774 and Fischer No. 3,348,503. While such planters are able to dispense seed at higher speeds than conventional seed plate planters, they have involved the use of movable parts subject to breakage. Another approach has involved the use of a rotary device having seed pick-up fingers with openings under vacuum to attract seed to the openings. Such devices have also been expensive and bulky and have required a great deal of power to maintain the vacuum. An example of such a vacuum planter is disclosed in the patent to Winter U.S. Pat. No. 3,142,274 and Clow U.S. Pat. No. 3,240,175. Still another approach in which positive air pressure is used is U.S. Pat. No. 3,637,108, issued on Jan. 25, 1972 to Loesch et al., Ser. No. 836,480, filed June 25, 1969.

SUMMARY OF THE INVENTION

The present invention utilizes only compressed filtered air which, in itself, reduces the possibility of clogging. Any dust or small particles that may enter with the seed is blown out with the escaping air through the discharge conduit. Because this system utilizes positive air pressure (greater than atmospheric) the planter can be built without regard for holding close tolerances. Escaping air is not a problem since it is relatively inexpensive. Another advantage of the positive air pressure system is that dirt and dust is not drawn into the device through every small opening as occurs in the vacuum systems.

An object of the invention is the provision of a planter of the pneumatic type wherein a rotary wheel or drum member has radial fingers each of which is provided with a ported passage communicating with an interior at atmospheric pressure and is rotatable in a seed supply in a housing under pressure greater than atmospheric, whereby positive pressure in the housing forces seed against the seed-receiving port where it is retained by greater than atmospheric pressure creating a pressure differential at the port.

DESCRIPTION OF THE DRAWINGS

FIG. 1 is a diagrammatic view in perspective, with parts broken away, of a multi-row planter embodying the features of this invention;

FIG. 2 is an enlarged sectional view of a portion of the structure shown in FIG. 1;

FIG. 3 is a section taken on the line 3—3 if FIG. 2; and

FIG. 4 is a diagrammatic perspective view, with parts broken away, of an optional form of the invention.

DESCRIPTION OF THE PREFERRED EMBODIMENT

In the drawings the numeral 10 designates the transversely elongated framework of a trailing type multirow planter adapted for connection to a conventional tractor having the usual power plant and suitable means for supplying air under pressure, and the frame of the planter is supported at its ends by wheels 11, only one of which is shown.

As illustrated diagrammatically in FIG. 1, a plurality of planter units 12 are mounted on the frame by means accommodating independent floating movement of the units relative to the frame to follow changes in ground contour. The planter units 12 are substantial duplicates and the external constructional details thereof form no part of the invention as claimed. However, it may be noted that each unit is mounted on the frame by a pair of laterally spaced drag links 13 the forward ends of which are pivotally connected to an angle bar 14 forming part of the planter frame, and between the rear ends thereof is mounted a ground engaging gauge wheel 15.

The seed selecting and dispensing mechanism of this invention is designated at 16 and includes a relatively stationary generally cylindrical housing 17 having a transverse portion 18 and sides 19 and 20 and is mounted between the drag links 13 by any suitable means such as bolts 21, which may be carried in slots 22 in sides 19 and 20 to accommodate adjustment of the vertical position of the wheel 15 relative to the housing. The drag link and housing assembly also supports a gang of furrow openers 23 to form furrows in the ground to which seed is directed in a manner and by means hereinafter to be described.

In the form of the invention shown in FIG. 1, a seed hopper 24 is mounted on each planter unit and seed contained therein is directed through a conduit 25 to an opening 26 in the transverse portion 18 of housing 17 to form in the lower portion of the housing a seed supply 27.

The structure of the housing 17 and the seed selecting and dispensing mechanism therein, indicated diagrammatically in FIG. 1, is illustrated in some detail in FIGS. 2 and 3. Here it will be observed that there is disposed in the housing and substantially coextensive with the axis thereof an actuator in the form of a stationary hollow or tubular shaft member 28 mounted in sides 19 and 20 of the housing and closed at its free end by a cap 29.

Concentrically with shaft 28 a rotary seed selector in the form of a wheel or drum 30 is disposed in openings 31 in side plates 19 and 20, rubber seals 32 indicated in FIG. 3 being provided between the rotary member and the housing. The feed wheel or rotor 30 includes a transverse cylindrical portion 33 and side plates 34 and 35, and hub portions 36 of sides 34 and 35 are directed inwardly for rotatable mounting on bearings 37 carried by hollow actuator member 28 and held in place by cover plates 38 affixed to plates 34 and 35.

Rotor 30 is revolved in the direction of the arrow shown in FIG. 2 by the provision of a hub 39 affixed as by welding to plate 35 and having secured thereto a sprocket wheel 40 driven by a chain 41 from another sprocket wheel 42 secured to a transverse shaft 43 mounted on the planter frame and driven by suitable means, not shown, from supporting wheel 11.

Radially projecting seed pick-up fingers 44 are circumferentially arranged in spaced parallel planes about rotary member 30 and each finger is seated in the transverse portion 33 thereof and has portions extending radially inwardly and outwardly therefrom. Each finger is tubular, being flared at its inner end projecting into the interior of the rotary member and having a central bore or air passage providing communication between the interiors of housing 17 and rotor 30 and terminating in a right angled port 46 in the leading edge of the finger, port 46 being beveled to engage and seat a seed as shown in FIG. 2.

It will be observed in FIGS. 2 and 3 that the seed supply 27 is in the path of the outer portions of fingers 44, and during rotation of the rotary feed wheel member 30 a seed is forced against the port 46 by air pressure and is held in position for a predetermined rotation of the wheel by positive air pressure in the interior of the housing creating a pressure differential therebetween and the interior of the rotary member.

As will be noted in FIG. 1, the air pressure in the interior of rotary member 30 is at zero, said member being open to the atmosphere by the provision of openings 47 circumferentially arranged about end plate 34. The positive pressure forcing the seed against the ports 46 is achieved by introducing air under relatively low pressure through a rectangular inlet 48 in the upper transverse portion 18 of the housing and connected to a tangentially directed supply tube 49. A tube 49 for each planter unit is connected to an elongated conduit 50, closed at its end and forming part of a compressed air supply system indicated in its entirety at 51 in FIG. 1 and including a manifold 52 extending to the air pressure supply source on the tractor, although it should be understood that, if desired, suitable air pump means may be mounted on the implement frame for the purpose. Thus, with the air in rotor 30 and in the air passages 45 of the fingers 44 at atmospheric pressure and air under pressure greater than atmospheric supplied to housing 17 and at the ports 46, a single seed is forced against these ports as the fingers pass through the seed supply, as shown in FIG. 2, and is carried around in a circular path by rotation of rotary member 30.

Seed is discharged by the fingers tangentially from the housing through an opening 53 in the transverse portion 18 for each of the laterally spaced groups of fingers 44. A conduit or tube 54 receives the seed and directs it downwardly to the furrows formed by the earth penetrating openers 23.

Overcoming the air pressure holding seeds to ports 46 to allow ejection of seed into outlet 53 is effected by injecting air under greater pressure than that in housing 17 into passages 46. To accomplish this actuator tube 28 for each of the planter units is connected to a tube 55 which, in turn, is connected to another elongated conduit 56 mounted on the frame parallel to conduit 50, both conduits being closed at their free ends. The other end of conduit 56 joins manifold 52 and receives air at the pressure supplied by the pressure source. Air under pressure in stationary hollow shaft members 28 passes outwardly through nozzles 57 projecting radially therefrom and terminating adjacent the path of the inner ends of fingers 44 and at a location in advance of seed outlet 53.

Each nozzle 57 has a passage 58 therethrough, the outer end of which is successively registrable with the inner ends of passages 45 in fingers 44. Inasmuch as air under pressure is supplied to both the actuator and the interior of the housing from the same source, suitable means is provided in a constriction in conduit 50 designated at 59 in FIG. 1 to reduce the pressure of the air fed to the interior of the housing below that supplied to the interior of member 28. However, it may be understood that, if desired, separate pump means may be provided for feeding air at the desired pressures to housing 17 and the actuator 28. Thus, upon registration of successive fingers 44 with nozzle 57, the jet of air escaping from the nozzle dislodges and ejects the seed in the manner and in the direction shown in FIG. 2 to discharge the seed into guide tube 54 to be conducted thereby to the ground.

In the modification shown diagrammatically in FIG. 4, the separate seed hoppers 24 are replaced by a single large hopper 60 which dispenses seed through a triangularly shaped funnel 61 into a wide opening provided in a single elongated housing 62. A unitary rotary member 63 substantially coextensive with the housing 62 is rotatably mounted in the housing and driven in a manner substantially the same as for rotary members 30 in FIG. 1 to 3, and is provided with similar circumferentially spaced seed selecting fingers 64.

A hollow actuator member 65 similar to actuator 28 extends the length of the rotary member concentric therewith and spaced from the inner periphery thereof. The interior of the rotary member is open to the atmosphere by the provision of openings 66 in end plate 67 and air under pressure is supplied to actuator 65 through a tube 68 connected to a manifold 69, which is supplied with air under pressure from a pressure source in the same manner as for the structure shown in FIGS. 1 to 3.

Air under pressure from manifold 69 is fed through a constriction 70 in a conduit 71 to reduce its pressure below that in actuator 65 but greater than atmospheric, prior to entry thereof into an air chamber 72 mounted on housing 62 and extending the length thereof, and from which the air passes through openings 73 into the interior of the housing between the inner periphery thereof and the rotatable feed wheel member.

As in the construction of FIGS. 1 to 3, seed is picked up by fingers 64 and discharged in the same manner from outlets provided in the housing to guide tubes 74 leading to conventional furrow openers 75 of the double disk type.

It is believed that the construction and operation of the improved planter seed selecting mechanism of this invention will be clearly understood from the foregoing description. It should likewise be understood that the planter mechanism described selects, holds and discharges seed without damage thereto. Furthermore, the construction is simple and economical and the air pressure required for its efficient operation is relatively low, resulting in a machine which plants different sizes and kinds of seed accurately and at high speeds.

What is claimed is:

1. A seed selecting device for a planter comprising, a generally cylindrical housing having a seed supply, a rotary member rotatably mounted in said housing having a hollow hub portion under atmospheric pressure and radially projecting seed pick up fingers, each of said fingers having a central bore and a seed engaging port of smaller diameter than the seed and providing communication through said bore between the interior of the housing and said hollow hub portion, said housing having an inlet therein for supplying air under pressure greater than atmospheric, whereby positive air pressure at said port constrains seed to adhere to said port, and a hollow actuating member stationarily mounted interiorly of said hub portion having a radial outlet successively registrable with the central bores in said fingers during rotation of the rotary member, said actuating member having means for delivering thereto air under pressure greater than that in the interior of said housing to overcome the pressure in said housing and dislodge seed from said port, a seed discharge outlet formed in said housing at a location such that said discharged seed passes through said outlet.

2. The invention set forth in claim 1, wherein said port is disposed perpendicularly to said central bore in the direction of rotation of said rotary member in the path of seed in said supply.

3. The invention set forth in claim 2, wherein the axial length of said rotary member is substantially equal to that of said housing and a plurality of circumferentially spaced seed pick up fingers are arranged in parallel planes lengthwise of said rotary member.

4. The invention set forth in claim 2, wherein said actuating member is tubular and is provided with a radially projecting tubular nozzle terminating adjacent the inner wall of said hub portion and having its outer end successively registrable with the bores in said fingers during rotation of the rotary member to discharge into said bores jets of air at a pressure greater than that in said housing.

5. The invention set forth in claim 4, wherein a conduit is connected to said outlet and directed tangentially downwardly therefrom in the path of seed discharged from said ports to receive the seed and guide it to the ground.

6. In a planter having a supporting frame, seed hopper and furrow opener means mounted on the frame, and seed selecting means disposed between the hopper means and the furrow opener means comprising, a stationary cylindrical housing, means extending between the hopper means and said housing for directing seed thereto to form a seed supply in the lower portion thereof, a hollow rotary member coaxially mounted in said housing for rotation therein, circumferentially spaced radially projecting seed selecting fingers mounted on said rotary member and engageable with the seed, each of said fingers having a central passage therethrough providing communication between the interior of said rotary member and the interior of said housing, the interior of said rotary member being vented to the atmosphere, a hollow stationary actuating member coaxially mounted in said rotary member, a radially projecting nozzle in said actuating member having an opening at its end successively registrable with the passages in said seed selecting fingers, each of said fingers having a port in the leading edge thereof communicating with said passage, means for directing air to the interior of said housing under pressure greater than atmospheric to force seed against said port to be held there during rotation of the rotary member, means for directing air to the interior of said stationary member under pressure greater than that in said housing and operable to eject the seed from said port upon registration of the opening in said nozzle with the passage in successive of said fingers after a predetermined rotation of said rotary member, and an outlet in said housing for discharging the ejected seed to the furrow opener means.

7. The invention set forth in claim 6, wherein a plurality of laterally spaced furrow openers are mounted on the frame and a plurality of seed selecting means are mounted on the frame at laterally spaced locations for selecting and discharging seed to the furrows formed by said furrow openers.

8. The invention set forth in claim 7, wherein separate seed hoppers are provided on the frame for each of said seed selecting means.

9. The invention set forth in claim 6, wherein said seed selecting means includes a single elongated cylindrical housing in which said rotary member and said actuating member are concentrically mounted and substantially coextensive with the axis thereof, a plurality of laterally spaced outlets being provided in said housing for directing seed to said furrow openers.

10. A seed selecting device for a planter comprising, a housing having a seed supply, a rotary member rotatably mounted in said housing having a hollow hub portion under atmospheric pressure and radially projecting seed pick up fingers, each of said fingers having a duct extending lengthwise thereof and a seed engaging port of smaller diameter than the seed and providing communication through said port and said duct between the interior of the housing and said hollow hub portion, said housing having an inlet for supplying air under pressure greater than atmospheric, whereby positive air pressure at said port constrains seed to adhere to said port, and a hollow actuating member mounted interiorly of said hub portion having outlet means successively registrable with the central bores in said fingers during rotation of the rotary member and during adherence of seed to the ports of said fingers, said actuating member having means operable during such registration for delivering to the radial ducts air under pressure greater than that in the interior of said housing to overcome the pressure in said housing and dislodge seed from said ports of the registered fingers, a seed discharge outlet formed in said housing at a location such that said discharged seed passes through said outlet.

11. The invention set forth in claim 1, wherein said ports are disposed to face perpendicularly to said finger ducts and in the direction of rotation of said rotary member in the path of seed in said supply.

* * * * *